(12) United States Patent
Sherrod

(10) Patent No.: US 7,072,754 B1
(45) Date of Patent: Jul. 4, 2006

(54) OPERATOR SELECTABLE ENGINE ASSIST BRAKING

(75) Inventor: Sean E. Sherrod, Lino Lakes, MN (US)

(73) Assignee: Polaris Industries Inc., Medina, MN (US)

( * ) Notice: Subject to any disclaimer, the term of this patent is extended or adjusted under 35 U.S.C. 154(b) by 276 days.

(21) Appl. No.: 10/685,900

(22) Filed: Oct. 15, 2003

(51) Int. Cl.
*G06F 7/00* (2006.01)
*G06F 17/00* (2006.01)

(52) U.S. Cl. .................... 701/54; 701/51; 477/44; 477/46

(58) Field of Classification Search ............. 701/51, 701/52, 53, 54; 477/41, 44, 46, 49
See application file for complete search history.

(56) References Cited

U.S. PATENT DOCUMENTS

| 4,022,146 | A  |   | 5/1977  | Sadler ..................... 180/273 |
|-----------|----|---|---------|--------------------------------------|
| 4,759,731 | A  |   | 7/1988  | Uchida et al. ............ 440/1     |
| 5,961,418 | A  |   | 10/1999 | Taniguchi et al. ......... 477/47    |
| 5,967,252 | A  |   | 10/1999 | Saban et al. ............. 180/336   |
| 6,033,338 | A  | * | 3/2000  | Jackson et al. ........... 477/44    |
| 6,513,611 | B1 | * | 2/2003  | Ito et al. .................. 180/179 |
| 6,536,408 | B1 | * | 3/2003  | Warner ................... 123/323    |
| 2002/0152838 | A1 |   | 10/2002 | Miguchi et al. ........... 74/745 |

* cited by examiner

*Primary Examiner*—Gertrude A. Jeanglaude
(74) *Attorney, Agent, or Firm*—Baker & Daniels LLP

(57) ABSTRACT

An operator selectable engine braking assist system is provided that allows the operator of a vehicle to select the amount of engine braking assist provided. An engine braking assist selector is provided to allow the operator to select a level of engine braking assist. A controller is programmed with an engine braking algorithm and implements the algorithm in response to the selector to produce engine braking in an amount selected by the operator.

28 Claims, 6 Drawing Sheets

OPERATOR SELECTABLE ENGINE ASSIST BRAKING

TECHNICAL FIELD

This invention relates to vehicle transmission systems, and, more particularly, to vehicle transmission systems that have an operator selectable engine assist braking.

BACKGROUND OF THE INVENTION

Beyond applying brakes, engine compression braking is the most common method for reducing vehicle speed. For discrete ratio transmissions, fixed gear manual and automatic, this is accomplished by manually putting the transmission into a lower gear so that the engine turns faster. Because downshifting is a manual operation, the operator of the vehicle can select when and if they want to downshift.

With continuously variable transmissions (CVTs), such as toroidal transmissions, the downshift occurs automatically. CVT's are used almost universally in snowmobiles to alleviate any need for the driver to shift the transmission as the vehicle accelerates through its range of speeds. The assignee of the present invention has also successfully utilized CVT's in its line of ATV's. Typically the CVT is connected to the output shaft of the vehicle's engine, the transmission providing continuously variable gear reduction from the relatively higher rotation speed of the engine to the relatively lower rotation speed of the vehicle drive axle.

In some types of vehicle drive trains, when the vehicle is traveling along at a given speed and the throttle is dropped (e.g., to an idle speed), the rotation of the drive wheels of the vehicle will backdrive the drive train, causing the engine to rotate at a speed greater than it otherwise would based on throttle position. The inherent frictional forces present throughout the drive train, including particularly the compression forces present in the engine cylinders, tend to slow the vehicle down. This condition is commonly referred to as engine braking, and can be a useful feature. The degree of engine braking provided (in vehicles capable of doing so) is dependent on the gear ratio of the transmission, in higher gears less braking is provided, and in lower gears more braking is provided.

Unlike manual transmissions which allow an operator of the vehicle to downshift and thus increase engine braking, CVTs downshift automatically and thus do not allow the operator of the vehicle to choose how much and when the transmission ratio is changed. Some riders prefer more engine braking assist than others. The amount of engine braking desired often depends on the condition of the terrain where the vehicle is being used and on the application for which the vehicle is being used. When an ATV is operated in hilly terrain, engine braking is often desired in order to reduce brake effort and wear on the brake pads. When the vehicle is operated on flatter terrain, engine braking is often undesirable. In such conditions, riders often prefer to coast as far as possible. Riders that are sporty often want to maintain vehicle speed and they do not always want engine braking. Riders that are pulling trailers often do want engine braking to assist the hand brakes. Even when operated under the same conditions, for the same purpose, different riders have different preferences. The desired ratio change of the transmission is dependent on the terrain on which the vehicle is operating as well as rider preferences. Thus, it would be desirable to provide engine braking assist that is rider selectable to account for rider preferences and terrain conditions.

SUMMARY OF THE INVENTION

According to a first aspect of the invention, there is provided a vehicle having an engine, a CVT, an engine braking assist selector and a controller. The CVT is operatively coupled to the engine and has a continuous ratio range. The engine braking assist selector may be activated by an operator of the vehicle and the controller is operatively coupled to the CVT and engine braking assist selector. The controller is programmed with an engine braking algorithm wherein the controller implements the algorithm if the engine braking assist selector is activated and outputs a control to the CVT to alter the ratio of the CVT to produce engine braking in an amount selected by the engine braking assist selector.

According to a second aspect of the invention, there is provided an interface for rider selectable engine braking assist. The interface includes an engine braking assist selector and a controller receiving inputs from a throttle position sensor and an engine braking assist selector wherein if the throttle position sensor is above a predetermined reading, no engine braking is implemented but if the throttle position sensor is below the predetermined reading, an engine braking algorithm is implemented by the controller wherein the amount of engine braking is dependent upon the output of the throttle position sensor and the output of the engine braking assist selector.

According to a third aspect of the invention, there is provided a continuously variable transmission system having a rotatable input shaft, a rotatable drive clutch, a rotatable output shaft, a rotatable driven clutch, an endless drive belt, an engine braking assist selector and a controller. The rotatable input shaft is coupled to an engine of a vehicle. The rotatable drive clutch is coupled to the input shaft and has a laterally stationary sheave with an inner belt engaging surface, a laterally moveable sheave with an inner belt engaging surface, means for normally biasing the moveable sheave away from the stationary sheave and for selectively moving the moveable sheave toward the stationary sheave in response to rotation of the drive clutch.

The rotatable output shaft is coupled to a drive axle of the vehicle. The rotatable driven clutch coupled to the output shaft, the driven clutch having a laterally stationary sheave with an inner belt engaging surface; a laterally moveable sheave with an inner belt-engaging surface, and means for normally biasing the moveable sheave toward the stationary sheave.

The endless drive belt is disposed about the drive and driven clutches and has a pair of side drive surfaces engageable against the inner belt-engaging surfaces of the sheaves.

The controller is programmed with an engine braking algorithm wherein when engine braking assist is requested, the controller will implement the algorithm and output a control to the CVT to alter the ratio of the CVT to produce engine braking in an amount selected by the selector.

According to a fourth aspect of the invention, there is provided a toroidal CVT having a rotatable input shaft coupled to an engine of a vehicle; a rotatable input disc coupled to the input shaft, a rotatable output shaft coupled to a drive axle of the vehicle; a rotatable output disc coupled to the output shaft, at least a pair of power rollers, each power roller having a spherical convex surface, wherein each power roller is located between the input and output discs so that the convex peripheral surface of each power roller abuts an inner surface of the input and output discs, a displacement shaft coupled to each power roller wherein; the displacement shafts pivot each power roller so that the convex peripheral surface of each power roller may abut various points on the inner surface of the input and output discs ranging from a maximum reduction condition in which the convex peripheral surfaces abut the inner surface of the input disc at an innermost edge thereof and against the inner surface of the output disc at an outermost edge thereof to a minimum reduction condition in which the convex peripheral surfaces abut the inner surface of the input disc at an outermost edge thereof and against the inner surface of the output disc at an innermost edge thereof;

an engine braking assist selector; and a controller programmed with an engine braking algorithm wherein when engine braking assist is requested, the controller will implement the algorithm and output a control to the CVT to alter the ratio of the CVT to produce engine braking in an amount selected by the selector.

BRIEF DESCRIPTION OF THE DRAWINGS

FIG. 3 is a side view showing a maximum reduction condition and FIG. 4 is a side view showing a minimum reduction condition.

DETAILED DESCRIPTION OF THE PREFERRED EMBODIMENTS OF THE INVENTION

Figure 1:
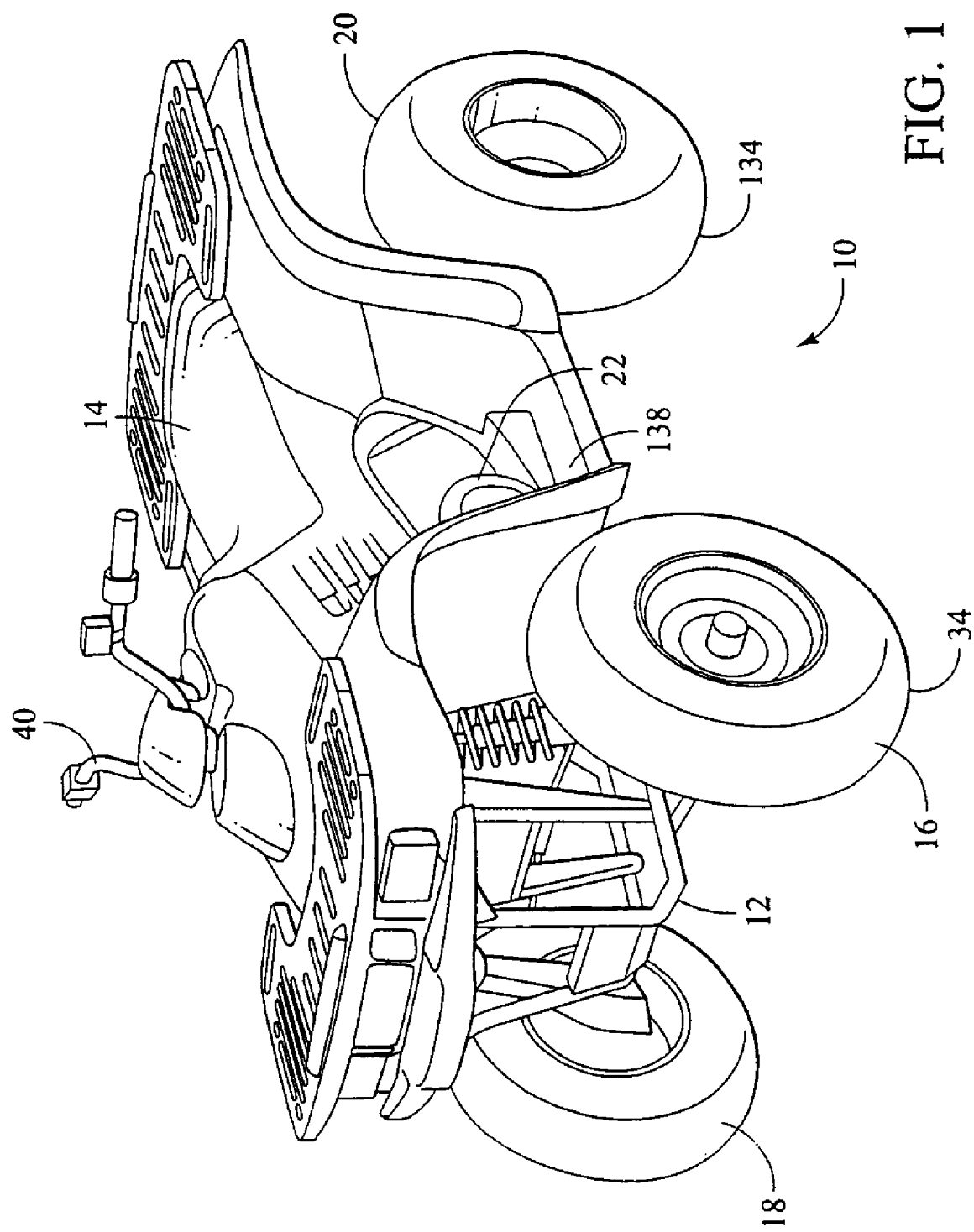
FIG. 1 is a perspective view of an ATV in which the embodiments of the invention may be incorporated.

The following detailed description should be read with reference to the drawings, in which like elements in different drawings are numbered identically. The drawings depict selected embodiments and are not intended to limit the scope of the invention. It will be understood that embodiments shown in the drawings and described above are merely for illustrative purposes, and are not intended to limit the scope of the invention as defined in the claims that follow.

FIG. 1 is a perspective view of an ATV 10. The ATV 10 includes a chassis 12 carrying a straddle type seat 14. The seat 14 is sufficiently narrow to be straddled by a vehicle rider. The ATV 10 has a left front wheel 16, a right front wheel 18, a left rear wheel 20 and a right rear wheel (not visible in FIG. 1). The ATV 10 also includes an engine 22 that is carried by chassis 12. The engine 22 is preferably coupled to at least some wheels of the ATV 10 via a drive train for propelling the ATV 10. The engine 22 may be used to power each rear wheel, and in some cases, also each front wheel. The ATV 10 also includes a left and right foot rest 38 extending from each side of the chassis, of which only the left foot rest can be seen in FIG. 1. The ATV 10 also includes a member 40 that can be used to steer the ATV 10.

Figure 2:
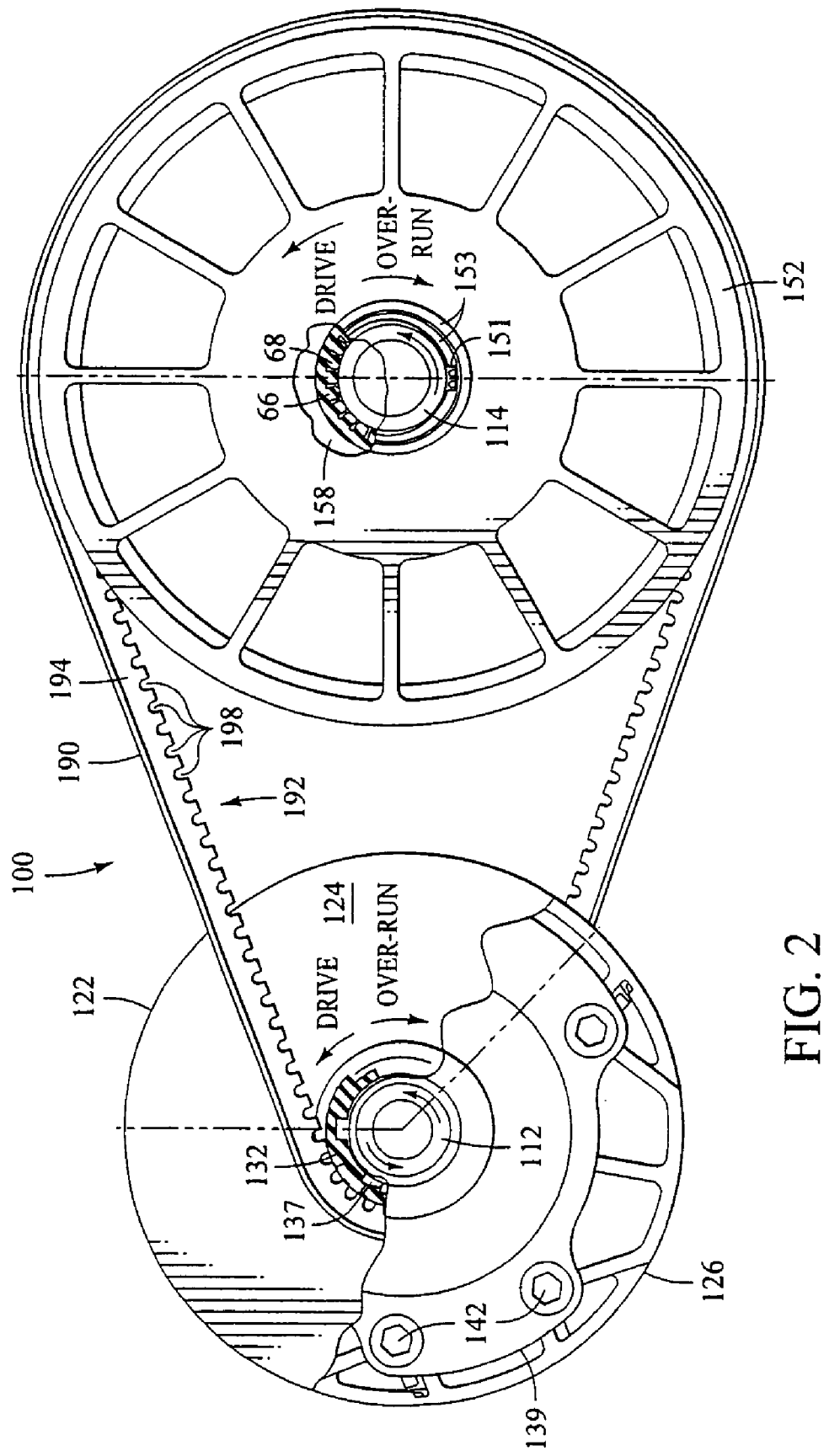
FIG. 2 is a side, partially broken-away view of a belt-driven continuously variable transmission system to which the embodiments of the invention are applicable.

FIG. 2 is a side, partially broken away view of a belt-driven continuously variable transmission system 100 which may be used in the ATV shown in FIG. 1. While the details of particular embodiments of the invention are described with reference to this particular type of CVT, it will be understood that variations in the structure and components of the CVT system may be made while still employing the substance of the embodiments of the invention. The system shown in FIG. 2 includes a rotatable split sheave primary drive clutch 122 mounted to a rotatable input shaft 112 (which typically is connected directly to the vehicle's engine). A rotatable split sheave secondary driven clutch 152 is mounted to a rotatable output shaft 114 (which typically is connected to additional drive train components, as described above, and ultimately to the drive axle and wheels of the vehicle). An endless, generally V-shaped flexible drive belt 190 is disposed around the two clutches. The CVT system shown in FIG. 2 is in the idle position. That is, the drive belt 190 is positioned near the periphery of the driven clutch 152 and near the center of the drive clutch 122. U.S. Pat. No. 6,149,540 describes a CVT and is incorporated herein by reference. Other types of CVTs may be used such as steel belt CVTs or hydrostatic CVTs.

Figure 3:
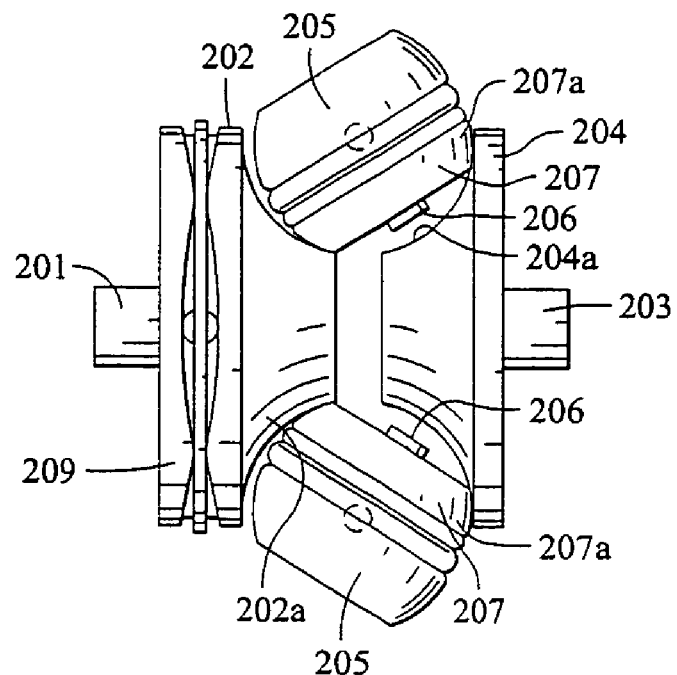
FIGS. 3 and 4 are schematic representations of a variable-speed drive of a toroidal type to which the embodiments of the invention are applicable, where
Figure 4:
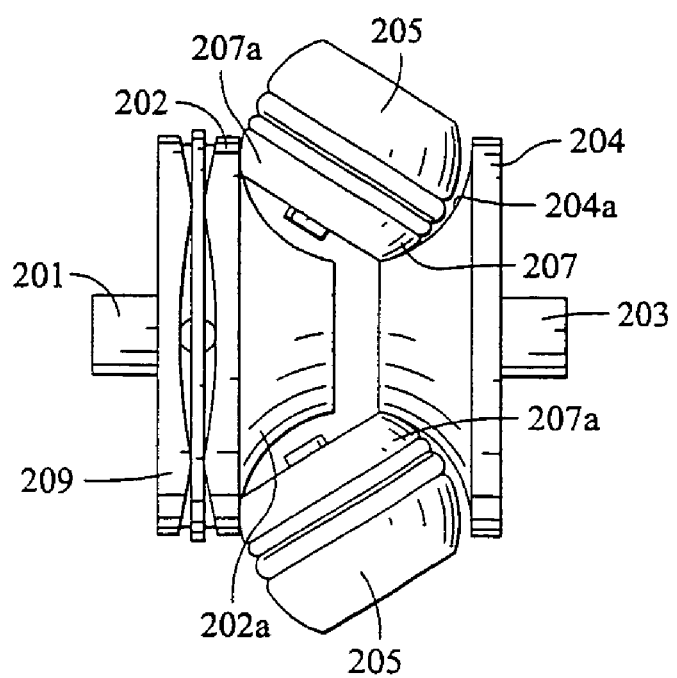

FIGS. 3 and 4 are schematic representations of a CVT of a toroidal type to which the embodiments of the present invention are applicable, where FIG. 3 is a side view showing a maximum reduction condition and FIG. 4 is a side view showing a minimum reduction condition.

A variable-speed drive of a toroidal type is generally designed so that an input disc 202 and an output disc 204 are attached to ends of an input shaft 201 and an output shaft 203, respectively, and power rollers 205, each having an adjustable inclined angle, are disposed between the input disc 202 and the output disc 204.

Inner surfaces 202a, 204a of the input and output discs 202, 204 which are opposed to each other have concave surfaces each having a toroidal profile. The peripheral surfaces 207 of each power roller 205 have a spherical convex surface. The convex peripheral surface 207a of the power rollers 205 are abutted against the inner surfaces 202a, 204a of the discs. A pressurizing means 209 such as a loading cam is disposed between the input shaft 201 and the input disc 202 by which the input disc 202 is elastically biased towards the output disc 204.

In the case of a toroidal type CVT having an arrangement as mentioned above, when displacement shafts 206 of the power rollers 205 are inclined so that the peripheral surfaces 207a of the power rollers 205 are abutted against the inner surface 202a of the input disc 202 near an innermost edge thereof and against the inner surface 204a of the output disc 204 near an outermost edge thereof, as shown in FIG. 3, a reduction in speed can be provided between the input shaft 201 and the output shaft 203. To the contrary, when the displacement shafts 206 of the power rollers 205 are inclined so that the peripheral surfaces 207a of the power rollers 205 are abutted against surface 204a of the output disc 204 near an innermost edge thereof as shown in FIG. 4, an increase in speed can be provided between the input shaft 201 and the output shaft 203. And, when the displacement shafts 206 are inclined to any condition between those shown in FIGS. 3 and 4, any intermediate speed ratio (between the maximum reduction and minimum reduction) can be obtained between the input shaft 201 and the output shaft 203.

Figure 5:
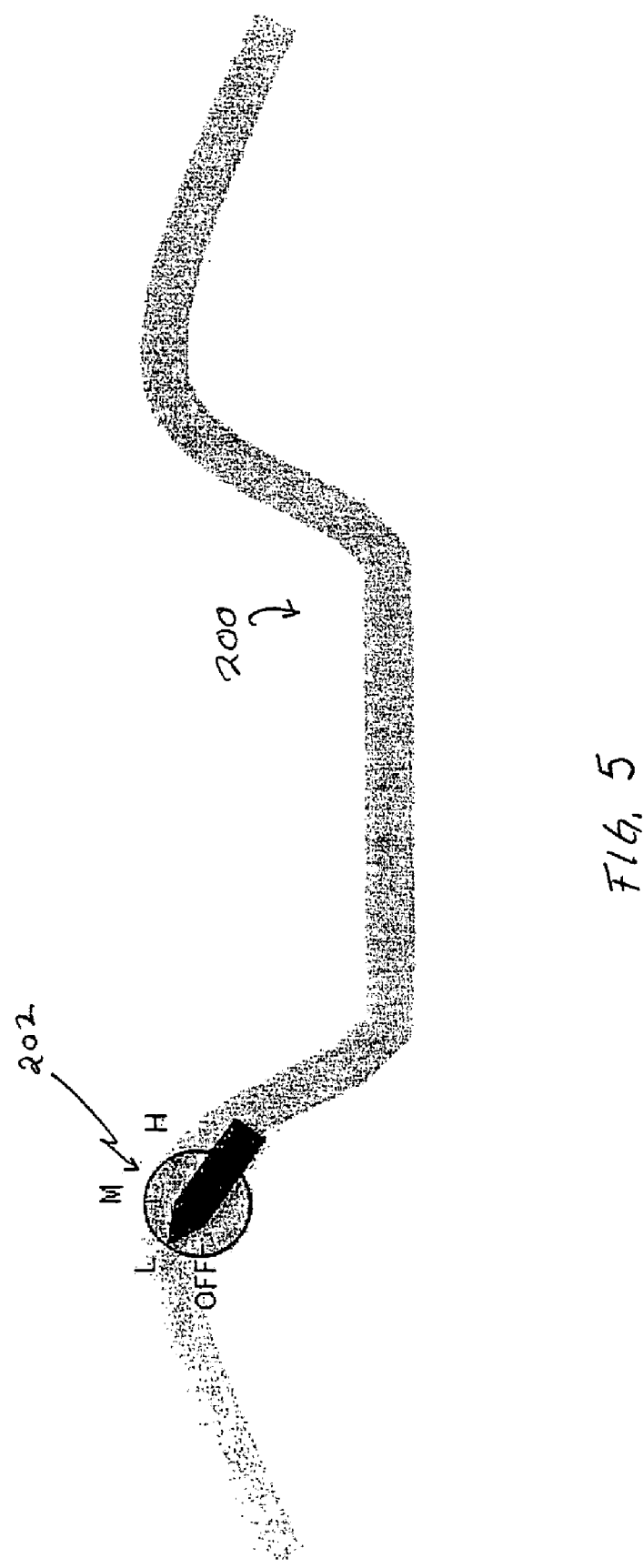
FIG. 5 is a perspective view of handlebars of an ATV incorporating an engine braking assist selector according to a preferred embodiment of the present invention.

FIG. 5 is a perspective view of handlebars 200 of an ATV incorporating an engine braking assist selector 202 according to a preferred embodiment of the invention. In this preferred embodiment, the engine braking assist selector 202 is in the form of a switch located on a handlebar 200 of the ATV. The switch has several positions, preferably four positions, OFF, LOW, MED, HIGH. This type of engine braking assist selector allows the rider to select how much engine braking assist is needed. It will be appreciated that other types of selection devices may be used such as dials, toggle switches, for example. In addition, the amount of engine braking assist may be designated as other descriptive labels or numeric values. In addition, the multi-position switch may be located elsewhere on the vehicle besides the handlebar.

Figure 6:
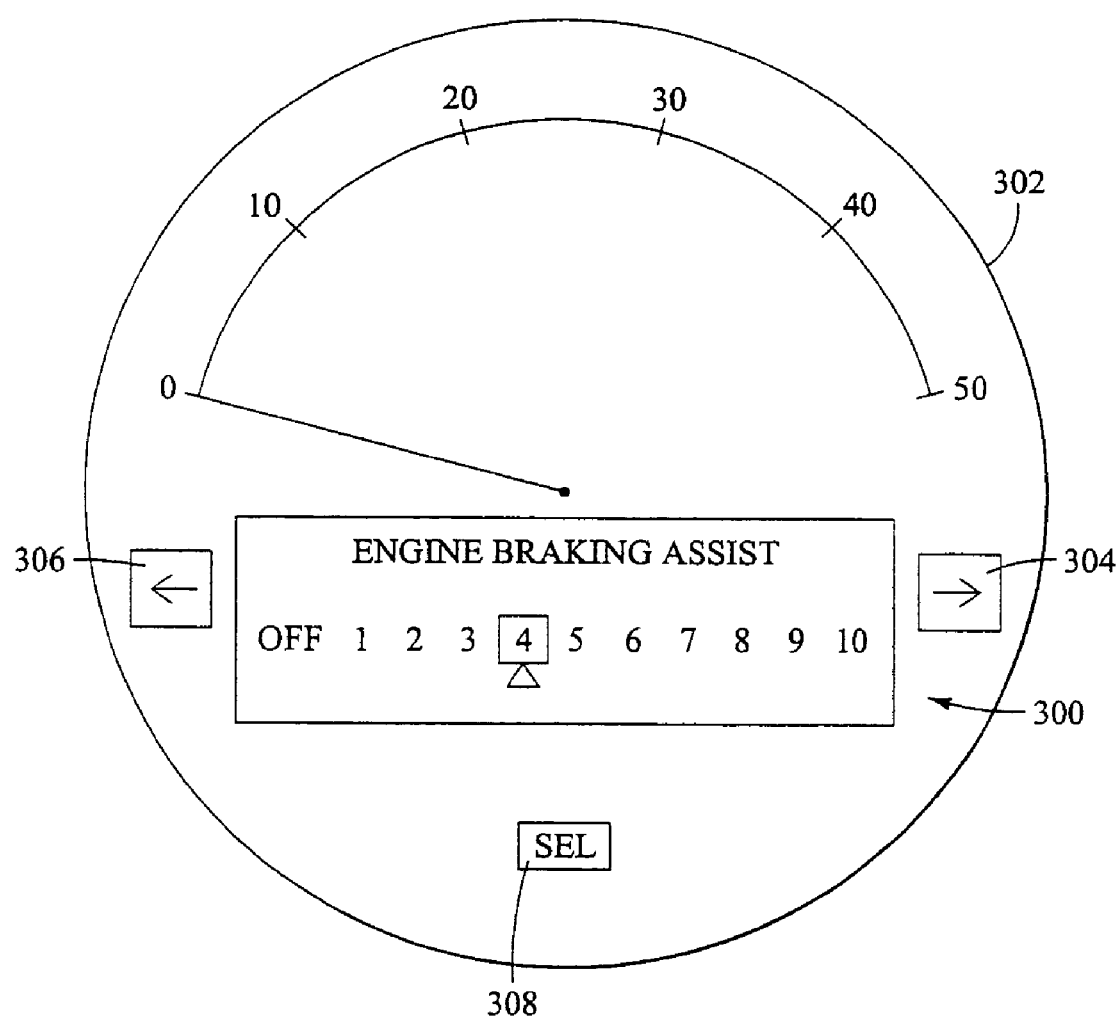
FIG. 6 is a front elevational view of an engine braking assist selector incorporated in a display according to a preferred embodiment of the invention.

FIG. 6 is a front elevational view of an engine braking assist selector according to another preferred embodiment of the invention. In this preferred embodiment, the selector 300 is incorporated in a vehicle's gauge display 302. In this preferred embodiment it is incorporated into the speedometer display. In a preferred embodiment, the rider can select the amount of engine braking assist from a numeric scale such as OFF, 1, 2, . . . 10, for example, using increase and decrease buttons 304, 306 respectively. When the desired level is reached using the forward or reverse buttons, the rider depresses the button labeled "SEL" 308 to activate the engine braking assist at that level. Of course it will be appreciated by those of ordinary skill in the art that other types of selectors may be used and that the selector shown in FIG. 7 may be incorporated in other types of gauges or may be located independently on an instrument panel.

Figure 7:
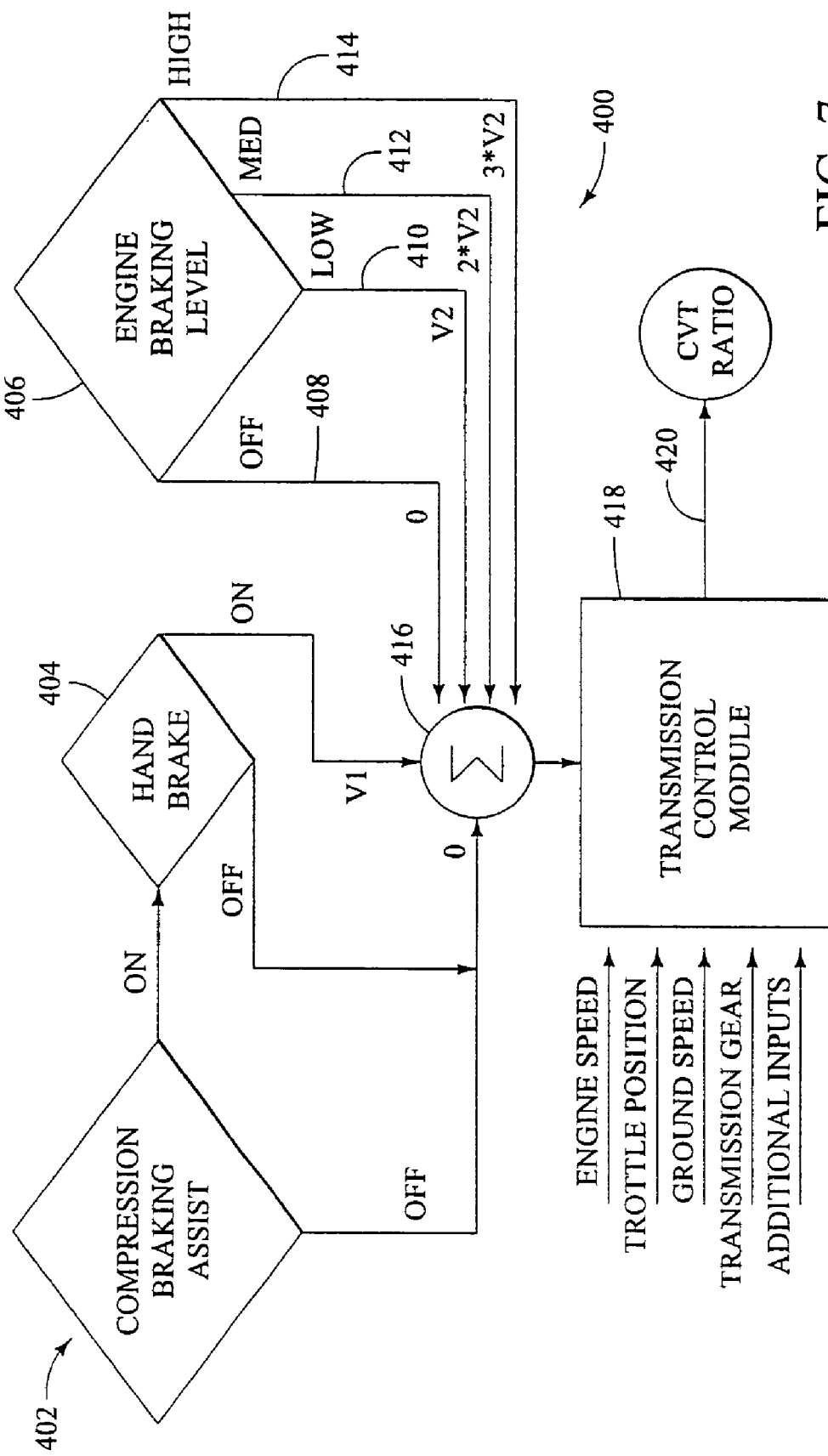
FIG. 7 is a block diagram of the engine braking assist control system according to a preferred embodiment of the invention.

FIG. 7 is a block diagram of the engine braking assist control system 400 according to a preferred embodiment of the invention. At block 402 it is determined if the engine braking assist is activated. If so, then at block 402 it is determined whether the hand brake is on or off. This is an optional feature and may be eliminated as will be described in further detail hereinafter. At block 406 it is determined what level of engine braking assist was selected by the operator of the vehicle. In the example shown, the levels are OFF 408, LOW 410, MED, 412 HIGH 414. Of course other levels such as 0, 1, 2, . . . 10, for example, may be used. Associated with each level is a control signal preferably in the form of a voltage level. Of course other types of analog or digital control signals may be used. The outputs of blocks 402, 404, 406 are fed into a summer 416 which sums the inputs and provides an output to a control module 418 or processor. Thus, for example, if engine braking is not selected, the voltage level provided to the processor 418 is zero. If the rider activates the engine braking assist and does not apply the hand brake, the processor receives a voltage that is dependent upon the engine brake assist level selected by the rider. If the rider also activates the hand brake, an additional voltage is added to the voltage reflecting the selected engine braking assist level output to the processor. The processor 418 also receives other inputs, namely, engine speed, throttle position, ground speed, transmission gear as indicated as well as other possible inputs. The processor 418 preferably monitors engine speed to ensure that the engine speed is controlled such that noise is not too high and that engine durability is not diminished. The processor 418 also preferably measures ground speed to ensure that the vehicle speed does not change too rapidly. The processor 418 produces an output 420 to control the ratio of the CVT according to the selected engine braking as will be described in detail hereinafter.

Thus, as an example, if a rider selected LOW or 1, the transmission would only shift to a slightly lower gear so that the rider would only experience minimal engine braking. With the selection of HIGH or 10 as the level of engine braking assist, the transmission would automatically shift to low gear, i.e., high reduction, so that the engine braking assist is maximized. When OFF is selected, no additional engine braking assist is provided.

Preferably the rider would have to stop the vehicle, change the engine braking assist level and restart the vehicle to make changes to the engine braking assist level. It could also be contemplated that the rider could change settings while moving, provided that the change does not distract the rider.

With the preferred embodiments of the invention, a rider can have the desired engine braking assist whether they are riding in mountainous or flat terrain without changing any physical hardware which can be both time consuming and expensive.

An example of how the engine braking assist would operate will now be described. With standard coast down, a rider is traveling down a hill at top speed and reduces the throttle to five percent thereby requesting that the engine speed be selected to produce five percent of its maximum possible output power, the engine would need to slow down so the transmission would try to find a higher gear but, since the transmission is already in its highest gear for top speed, it would not be able to adjust at all and the engine would not provide any additional braking. For the system to react properly to achieve engine braking, it would need to speed the engine up by transitioning to a lower gear. To do this, an automatic control scheme according to the preferred embodiments of the invention is needed.

One possible control algorithm could be based on two parameters, a cut-in parameter and a bias ratio parameter. For each level of engine braking assist, a particular cut-in value and bias ratio would be associated therewith. For example, OFF would correspond to a cut-in of 0% and a bias ratio of 0. Five or Medium might correspond to a cut-in of 10% and a bias ratio of 1.5. Ten or High might correspond to a cut-in of 20% and a bias ratio of 3. These numbers are given by way of example and the proper response would have to be tailored to the particular vehicle model. In addition, it may be necessary to add a safety feature so that the engine braking assist is never too aggressive that it would cause a rider to have difficulty in controlling the vehicle.

The cut-in parameter refers to the position of the throttle. The cut-in parameter indicates where in the throttle position range the system transitions from a power request to an engine braking request. Thus, if the cut-in parameter is set at 10%, above 10% throttle, the control system seeks to provide the proper engine speed for the requested power. Below 10% the control system tries to back-drive (speed up) the engine to provide engine braking. The bias ratio refers to the amount of engine braking that the control system seeks. The higher the bias ratio, the greater the engine braking. A bias ratio of 1.5, for example, would correspond to an engine speed 1.5% faster than the standard control scheme. Thus, as an example, if the rider selects an engine braking assist level of 5 that represents a cut-in of 10% and a bias ratio of 1.5, the system would perform as reflected in the table below.

| Throttle Position | Control Response (Cut-In = 10%, bias ratio = 1.5) |
| --- | --- |
| 10% | Normal Operation - engine speed produces 10% of maximum engine output |
| 9% | Engine Braking - engine speed is 1.5% faster than normal operation |
| 8% | Engine Braking - engine speed is 3% faster than normal operation |

-continued

| Throttle Position | Control Response (Cut-In = 10%, bias ratio = 1.5) |
|---|---|
| 6% | Engine Braking - engine speed is 6% faster than normal operation |
| 0% = Closed | Engine Braking - engine speed is 15% faster than normal operation |

The engine braking algorithm may be described by equation (1) below:

$$X=(\text{cut-in \%}-\text{throttle position})\times\text{bias ratio}+C \qquad (1)$$

where X is the increase in engine speed value as a percentage over normal operation, throttle position is measured as a percentage of throttle open position and C is a constant, where negative values of X are ignored.

An optional feature is to provide engine assist braking whenever the manual brakes are applied or provided by block 404 in FIG. 4. Whenever this option is included and turned on, the engine braking control system 400 would monitor the hand brake signal. If the hand brake signal is applied, the engine braking assist supplements the manual braking. Such a feature would reduce braking effort and improve brake pad durability.

The embodiments of the invention may be used in all types of CVTs such as rubber or steel belt CVTs, hydrostatic transmissions and toroidal transmissions.

While preferred embodiments of the invention have been described, it should be understood that various changes, adaptations and modifications may be made therein without departing from the spirit of the invention and the scope of the appended claims.

What is claimed is:

1. A vehicle comprising:
an engine having a throttle;
a CVT operatively coupled to the engine wherein the transmission has a continuous ratio range;
an engine braking assist selector which may be activated by an operator of the vehicle; and
a controller operatively coupled to the CVT and engine braking assist selector, the controller programmed with an engine braking algorithm wherein the controller implements the algorithm if the engine braking assist selector is activated and outputs a control to the CVT to alter the ratio of the CVT to produce engine braking in an amount selected by the engine braking assist selector, the engine braking algorithm being adapted to increase engine speed in proportion to an amount by which the throttle is positioned below a predetermined setting.

2. The vehicle according to claim 1 wherein the engine braking assist selector has multiple settings that the operator of the vehicle may select from to control the amount of engine braking provided, each of the multiple settings corresponding to a bias ratio, and wherein the engine braking algorithm is further adapted to increase engine speed by an amount proportional to the bias ratio.

3. The vehicle according to claim 1 wherein the engine braking assist selector comprises a multi-position switch.

4. The vehicle according to claim 3 wherein the multi-position switch is located on a handlebar of the vehicle.

5. The vehicle according to claim 1 wherein the engine braking assist selector comprises a user selectable menu on an instrument panel of the vehicle.

6. A vehicle comprising:
an engine;
a CVT operatively coupled to the engine wherein the transmission has a continuous ratio range;
an engine braking assist selector which may be activated by an operator of the vehicle; and
a controller operatively coupled to the CVT and engine braking assist selector, the controller programmed with an engine braking algorithm wherein the controller implements the algorithm if the engine braking assist selector is activated and outputs a control to the CVT to alter the ratio of the CVT to produce engine braking in an amount selected by the engine braking assist selector, wherein the engine braking algorithm is defined by the equation, $$X=((\text{cut-in \%})-\text{throttle position})\times\text{bias ratio}+C,$$

where X is the increase in engine speed value as a percentage over normal operation, throttle position is measured as a percentage of throttle open position and C is a constant, where negative values of X are ignored.

7. The vehicle according to claim 1 wherein the CVT is a rubber belt-driven CVT.

8. The vehicle according to claim 1 wherein the CVT is a steel belt-driven CVT.

9. The vehicle according to claim 1 wherein the CVT is hydrostatic.

10. An interface for rider selectable engine braking assist in a toroidal CVT, the interface comprising:
an engine braking assist selector; and
a controller receiving inputs from a throttle position sensor and an engine braking assist selector wherein if the throttle position sensor is above a predetermined reading, no engine braking is implemented but if the throttle position sensor is below the predetermined reading, an engine braking algorithm is implemented by the controller wherein the amount of engine braking is proportional to the difference between the predetermined reading and the throttle position sensor.

11. The vehicle according to claim 9 wherein the engine braking assist selector has multiple settings that the operator of the vehicle may select from to control the amount of engine braking provided.

12. The vehicle according to claim 10 wherein the engine braking assist selector comprises a multi-position switch, and wherein the amount of engine braking is further proportional to an output provided by the multi-position switch.

13. The vehicle according to claim 12 wherein the multi-position switch is located on a handlebar of the vehicle.

14. The vehicle according to claim 10 wherein the engine braking assist selector comprises a user selectable menu on an instrument panel of the vehicle.

15. An interface for rider selectable engine braking assist in a toroidal CVT, the interface comprising:
an engine braking assist selector; and
a controller receiving inputs from a throttle position sensor and an engine braking assist selector wherein if the throttle position sensor is above a predetermined reading, no engine braking is implemented but if the throttle position sensor is below the predetermined reading, an engine braking algorithm is implemented by the controller wherein the amount of engine braking is dependent upon the output of the throttle position sensor and the output of the engine braking assist selector, wherein the engine braking algorithm is defined by the equation, $$X = ((\text{cut-in \%}) - \text{throttle position}) \times \text{bias ratio} + C$$

where X is the increase in engine speed value as a percentage over normal operation, throttle position is measured as a percentage of throttle open position and C is a constant where negative values of X are ignored.

16. A continuously variable transmission (CVT) system comprising:
    a rotatable input shaft coupled to an engine of a vehicle;
    a rotatable drive clutch coupled to the input shaft, the drive clutch having
        a laterally stationary sheave with an inner belt engaging surface,
        a laterally moveable sheave with an inner belt engaging surface,
        means for normally biasing the moveable sheave away from the stationary sheave and for selectively moving the moveable sheave toward the stationary sheave in response to rotation of the drive clutch;
    a rotatble output shaft coupled to a drive axle of the vehicle;
    a rotatable driven clutch coupled to the output shaft, the driven clutch having
        a laterally stationary sheave with an inner belt engaging surface;
        a laterally moveable sheave with an inner belt-engaging surface, and
        means for normally biasing the moveable sheave toward the stationary sheave; and
    an endless drive belt disposed about the drive and driven clutches, the belt having a pair of side drive surfaces engage able against the inner belt-engaging surfaces of the sheaves;
    an engine braking assist selector; and
    a controller programmed with an engine braking algorithm wherein when engine braking assist is requested, the controller will implement the algorithm and output a control to the CVT to alter the ratio of the CVT to produce engine braking in an amount selected by the selector.

17. The vehicle according to claim 16 wherein the drive belt is a rubber drive belt.

18. The vehicle according to claim 16 wherein the drive belt is a steel drive belt.

19. The vehicle according to claim 16 wherein the engine braking assist selector has multiple settings that the operator of the vehicle may select from to control the amount of engine braking provided.

20. The vehicle according to claim 16 wherein the engine braking assist selector comprises a multi-position switch.

21. The vehicle according to claim 20 wherein the multi-position switch is located on a handlebar of the vehicle.

22. The vehicle according to claim 16 wherein the engine braking assist selector is a user selectable menu on an instrument panel of the vehicle.

23. The vehicle according to claim 16 wherein the engine braking algorithm is defined by the equation, $$x = ((\text{cut-in \%}) - \text{throttle position}) \times \text{bias ratio} + C,$$

where x is the increase in engine speed value as a percentage over normal operation, throttle position is measured as a percentage of throttle open position and C is a constant, where negative values of X are ignored.

24. A toroidal CVT comprising:
    a rotatable input shaft coupled to an engine of a vehicle;
    a rotatable input disc coupled to the input shaft,
    a rotatable output shaft coupled to a drive axle of the vehicle;
    a rotatable output disc coupled to the output shaft,
    at least a pair of power rollers, each power roller having a spherical convex surface, wherein each power roller is located between the input and output discs so that the convex peripheral surface of each power roller abuts an inner surface of the input and output discs,
    a displacement shaft coupled to each power roller wherein; the displacement shafts pivot each power roller so that the convex peripheral surface of each power roller may abut various points on the inner surface of the input and output discs ranging from a maximum reduction condition in which the convex peripheral surfaces abut the inner surface of the input disc at an innermost edge thereof and against the inner surface of the output disc at an outermost edge thereof to a minimum reduction condition in which the convex peripheral surfaces abut the inner surface of the input disc at an outermost edge thereof and against the inner surface of the output disc at an innermost edge thereof;
    an engine braking assist selector; and
    a controller programmed with an engine braking algorithm wherein when engine braking assist is requested, the controller will implement the algorithm and output a control to the CVT to alter the ratio of the CVT to produce engine braking in an amount selected by the selector.

25. The vehicle according to claim 24 wherein the engine braking assist selector has multiple settings that the operator of the vehicle may select from to control the amount of engine braking provided.

26. The vehicle according to claim 24 wherein the engine braking assist selector comprises a multi-position switch.

27. The vehicle according to claim 26 wherein the multi-position switch is located on a handlebar of the vehicle.

28. The vehicle according to claim 24 wherein the engine braking assist selector is a user selectable menu on an instrument panel of the vehicle.

* * * * *